July 30, 1974     F. A. ZENZ     3,826,738

FOLDED TRANSFER LINE REACTOR

Filed March 23, 1972

United States Patent Office 3,826,738
Patented July 30, 1974

3,826,738
FOLDED TRANSFER LINE REACTOR
Frederick A. Zenz, Roslyn Harbor, N.Y.
(Box 205, Rte. 9D, Garrison, N.Y. 10524)
Filed Mar. 23, 1972, Ser. No. 237,346
Int. Cl. B01j 9/16; B65g 53/00; C10g 13/14
U.S. Cl. 208—153                                8 Claims

ABSTRACT OF THE DISCLOSURE

A folded transfer line reactor in which a reverse flow of gas or vaporized liquid is introduced at points of change in direction of gas and solid flow to cushion the following particles and thereby avoid erosion of the transfer line and attrition of the particles.

There is also disclosed a transfer line reactor in which recycled slurry is introduced into the reactor at a point intermediate the ends of the reactor (either a straight or folded reactor) to thereby control the degree of cracking of the recycled slurry.

---

The invention relates to fluid catalytic cracking (FCC) units, and particularly to dilute phase FCC untis.

With the development of more active catalysts it has been recognized in many process applications that a considerable amount of reaction occurs within the conveying lines used to flow catalyst into the reactor proper, utilizing reactant feed gases as the conveying medium, that with only a small additional length of conveying lines it is possible to eliminate completely the conventional reactor. The provision of a fluid catalytic cracking unit absent the conventional dense phase fluid bed reactor is especially advantageous since it reduces the inventory of catalyst to a level below that normally required in a fluid bed reactor, and permits the achievement of a more desirable distribution of products since the gas and solids backmixing which occurs in a conventional fluid bed is eliminated. Moreover the apparatus for feeding the gas to the reactor has less stringent requirements since the feed gas compression will be lower due to the fact that pressure loss through a conveying line is only a fraction of the pressure loss through a dense phase fluidized bed of catalytic material.

If one considers the case of catalytic cracking of petroleum fractions, it can be determined as an approximation that it requires one hundred and forty feet of conveying or transfer line reactor to achieve approximately the same degree of feed gas conversion as against a twelve foot deep bed in a conventional fluid bed reactor. With the addition of piping and auxiliaries, the structure for the conventional fluid bed reactor can go to fifty feet, and since a transfer line reactor can be constructed with a 180° bend in the transfer line, the structural heights of the two different type reactors are more nearly comparable. In any event this advantage of up and down flow allows significant height reductions thus making transfer line reactors extremely desirable.

However, the introduction of bends in the transfer line reactor, though advantageous from a structural height standpoint, results in severe line erosion at the point of line reversal or bends. In order to avert this line erosion the bends may be constructed as tees instead of elbows, as is common practice in pneumatic conveying, so that solids piled up at one arm of the tee act as a barrier or lining to protect the transfer line material itself. While the transfer line bend is thus protected there is one adverse consequence. And that is increased catalyst attrition. This occurs when particles of catalyst in motion with the vaporized feed stock now impinge on the catalyst lying in the arm of the tee which is protecting the bend against erosion. Such catalyst attrition occurs whenever there are bends in the line, whether in the form of a tee which protects the line from erosion, or in a simple elbow or cap structure.

It has been discovered that catalyst attrition can be minimized in a folded transfer line while at the same time minimizing erosion of the transfer line where its direction is changed. This two-fold advantage can be gained by cushioning the catalyst particle impact at the transfer line reversal point with a counterflow of gas or vaporized feed stock at that point. The counterflow principle is particularly effective in a concentric arrangement as will be described, and it would make it feasible to introduce several bends into the transfer line. It would also make it feasible to introduce feed stock at several points along the transfer line as well as to introduce "different" feed stocks along the process path. Thus, in catalytic cracking it would permit very effective use of recycle oil as the cushioning jet.

The objects of the invention is to provide an improved transfer line catalytic processing unit.

In carrying out the invention a folded transfer line processing unit is provided with means for introducing a cushioning flow of gas at the bends in the transfer line.

Features and advantages of the invention may be gained from the foregoing as well as from the description of the preferred form of the invention which follows:

Figure 1:
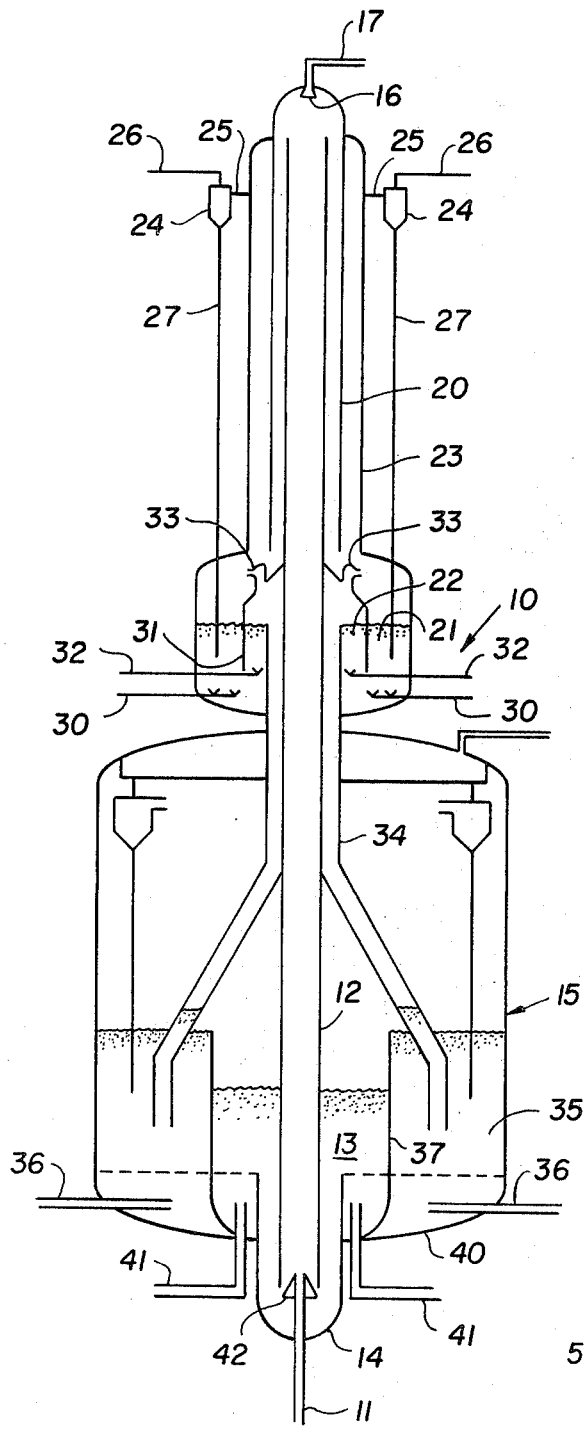
FIG. 1 is a schematic sectional view of a catalytic cracking unit embodying the invention.

Referring now to the drawing and especially to FIG. 1 which illustrates a fluid catalytic cracking unit, fresh feed oil is fed to the processing unit 10 through a feed pipe 11. The vaporized feed oil is introduced to the transfer line 12 carrying with it hot catalyst 13 which is drawn from the well 14 of unit 15. The catalyst travels up transfer line 12 in dilute-phase suspension in the feed oil which is thereby in process of being cracked. At the top of the transfer line recycle oil is introduced through nozzle 16 from feed line 17. The nozzle directs the recycle oil counter to the upflowing stream which thereupon, with the recycle oil, flows downwardly through the annular space formed between transfer line 12 and the concentric cylinder 20. The processing of the feed oil and the recycle oil continues during this downward flow.

When the suspension catalyst and vaporized oil reaches the bottom of cylinder 20, the catalyst fails into a secondary reactor 21 or simply into a steam stripper 22 while the cracked vaporized oil passes upwardly through the annular space between cylinder 20 and outer shell 23 to cyclones 24. The cracked vaporized oil enters the cyclones through pipes 25 and exits through lines 26 which lead to a produce fractionating column. Any catalyst particles entrained in the cracked vaporized oil and separated therefrom in cyclones 24 are returned to the secondary reactor 21 through dip-leg 27.

If the vessel formed by shell 23 is to be a secondary reactor, then vaporized oil will be fed through inlet pipe 30 so that a reaction process can take place in that part of the vessel lying between the outer shell 23 and the inner cylindrical divider 31. If no secondary reaction process is to take place, steam will be fed through pipes 30 to strip the catalyst deposited between divider 31 and shell 23. Steam will be fed through pipes 32 to the stripper 22 part of the vessel and will be discharged from stripper 22 through vents 33 provided in the conical roof section of the stripper.

As the catalyst level builds up in stripper 22, the catalyst will overflow wall 34 and fall by gravity through the annular space between transfer line 12 and wall 34 to the regenerator portion 35 of unit 15. Here accumulated carbon is burned off the catalyst particle surfaces; air being fed to the regenerator through lines 36. As the catalyst level builds up in regenerator 35 the catalyst will overflow partition 37 and enter the steam stripper or secondary regeneration zone 40 where it is stripped by steam or further regenerated with air entering the unit by way of lines 41. Eventually the catalyst reenters transfer line 12 through plug valve 42.

The severity of cracking in FIG. 1 arrangement can be modulated not only by changing the catalyst circulation rate by controlling the feed through plug 42 but also by varying the ratio of fresh feed and recycle oil introduced through feed lines 11 and 17 respectively.

Figure 2:
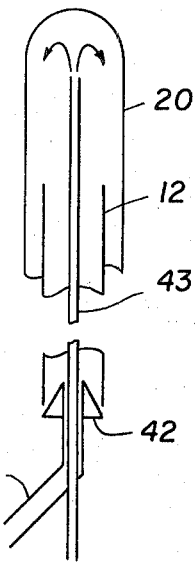
FIG. 2 is a fragmentary view showing another way to introduce the cushioning gas.

Rather than introduce oil directly at the top of transfer line 12 as in the FIG. 1 embodiment, it is also feasible to introduce the cushioning oil by way of a concentric tube 43 passing up through the center of transfer line 12 as illustrated in FIG. 2. This alternate arrangement provides a ready means of preheating the recycle or fresh feed oil introduced through tube 43.

Figure 3:
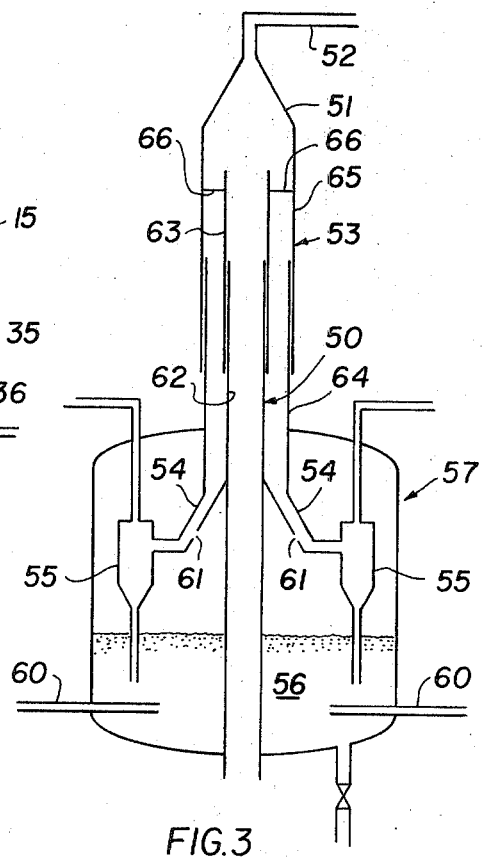
FIG. 3 is a schematic sectional view of another arrangement of catalytic cracking unit embodying the invention.

The invention is shown in FIG. 3 in a different embodiment which tends to assure a more even distribution of solid flow to the various cyclones employed in the processing unit. This desirable result is achieved because the solids are entering the cyclones while flowing downwardly generally rather than upwardly in which latter case gravity would tend to mal-distribute the particles reaching the various cyclones spaced around the reactor. As a further consideration the annular passageway between shell 23 and cylinder 20 in FIG. 1 is eliminated thus minimizing the size of the reactor.

In the FIG. 3 embodiment the suspension of catalyst particles in the feed gas enters the transfer line 50 and flows upwardly therethrough until it is cushioned by the gas jet entering the conical cap 51 through feed line 52. The feed gas, cushioning gas, and catalyst particles then flow downwardly through the annular space between transfer line 50 and cylinder 53 to the series of exit pipes 54, each of which leads to a cyclone 55. The cyclones separate the catalyst particles from the product gases and return them to the stripper portion 56 of the reaction vessel 57. The stripping gas is fed through lines 60 and exits from the vessel through ports 61 which are shown leading to cyclones 55 but which could lead to a separate cyclone system if desired. It will be observed from the drawing that transfer line 50 could comprise a stationary segment 62 and a movable segment 63 that is closely fitted over segment 62 so as to telescope therewith. Similarly, cylinder 53 comprises a stationary member 64 and a movable member 65 that is closely fitted over member 64. Segment 63 and member 65 are joined as an assembly by several spoke-like elements 66. The arrangement is such that the length of the transfer line reactor can be altered, if desired, by raising or lowering the assembly of segment 63 and member 65. Most likely this would be done when the reactor is put into service and optimum operating conditions are being established. After which the two members of cylinder 53 could be bolted or otherwise joined together.

In operation the invention will be described in the process of catalytically cracking higher molecular weight petroleum fractions into the more valuable products of gasoline, fuel oil, and lubricating oils. In this process the hydrocarbon stream to be cracked is preheated in a furnace and introduced into what is essentially a pneumatic conveying pipe in which it picks up hot regenerated catalyst particles and transports them through a length of pipe sufficient to achieve the desired degree of cracking. The capping of this conveying pipe or transfer line reactor so that the cracked gas and catalyst turn 180° and return through an annulus serves not only to shorten the overall height of the reactor but also allows an optimum degree of conversion of the feed stock to more useful products. At the end of the transfer line reactor catalyst and cracked gases are separated, and the cracked gases are cooled, condensed and sent to a fractionation or distillation tower where they are separated into gasoline, fuel oil, lubricating oil, and residual heavier molecular weight fractions. Whatever catalyst fines are not separated from the gases are carried over with the cracked gases to the distillation tower where they are washed along with the condensed liquids to the bottom of the tower. From there they leave with the heavy liquid fraction as a slurry. This slurry is usually allowed to partially separate so that a useful oil fraction can be drawn off. The remaining heaviest and thickest slurry is sent back to the transfer reactor where it is pumped in as a liquid to be quickly vaporized and further cracked. In the invention disclosed hereinabove, this slurry recycle stream can be used advantageously as the cushioning stream injected at the point where the catalyst and gas must change direction in the transfer line.

By introducing the recycle slurry nearer the end of the transfer line reactor (rather than at the front end where it would undergo cracking conditions for a longer period of time as it travels the full length of the reactor) the re-cycled material is not over cracked. In fact, this advantage of not overcracking recycled slurry can be achieved in a straight transfer line reactor by introducing the recycled slurry at a point intermediate the ends of the reactor. Or the slurry can be introduced in a folded transfer line reactor at a point other than where the line changes direction or bends. Thus the slurry may be introduced at several points along the transfer line, either to control the degree of cracking of the slurry, or to serve as a cushioning jet when introduced at a bend in the transfer line, or to achieve both purposes in a folded transfer line reactor.

Having thus described the invention it is clear that it may be embodied in many different reaction structures and employed in many different processes without departing from the spirit or scope thereof. Hence it is to be understood that the accompanying drawing and the description are to be interpreted as illustrative rather than in a limiting sense.

What is claimed is:

1. A transfer line catalytic reactor comprising a first reactor section in which feed stock and catalyst flow in a first direction, a second reactor section in which feed stock and catalyst flow in a second direction, means for changing the direction of flow of feed stock and catalyst from said first reactor section to said second reactor section, means for feeding fluid feed stock and catalyst to said first reactor section, means for further processing feed stock processed in said first and said second reactor sections, means for feeding part of the further processed feed stock into the reactor at said direction changing means in a direction counter to the flow of feed stock and catalyst whereby said direction changing means is protected against erosion by the catalyst attrition of the catalyst is minimized, and the processed feed stock fed into the reactor at said direction changing means is again subjected to catalytic action.

2. A transfer line reactor according to claim 1 in which said first reactor section comprises a cylindrical conduit, said second reactor section is in the form of an annulus formed by an outer cylindrical shell surrounding said cylindrical conduit, and said flow directing means is a cap member closing the end of said outer cylindrical shell and forming a plenum in which the feed stock and catalyst is directed into said second reactor section.

3. A transfer line reactor according to claim 2 in which the feed stock introducing means comprises nozzle means for spraying feed stock from said cap member towards said cylindrical conduit.

4. A transfer line reactor according to claim 3 in which said cap member is in the form of a cone having a base diameter equal to the diameter of said cylindrical shell and in which said nozzle means is located at the apex of the cone.

5. A transfer line reactor according to claim 2 in which the feed stock introducing means comprises pipe means located within said cylindrical conduit for spraying feed stock into the plenum formed by said cap member.

6. A transfer line reactor according to claim 2 wherein the inner conduit and the outer shell each comprise at least two telescoping sections whereby the length of the inner conduit and the outer shell can be altered to adjust the effective length of the reactor.

7. A transfer line reactor according to claim 6 including spoke-like members joining one section of the inner conduit to one section of the outer shell whereby said sections can be moved as a unit.

8. The method of operating a transfer line catalytic reactor having two reactor sections in which the fluid feed stock and catalyst stream undergoes a change in direction in flowing from one section to the other, which method comprises the steps of introducing fluid feed stock and catalyst to the transfer reactor, further processing feed stock exiting from the transfer reactor, and thereafter feeding a part of the further processed fluid feed stock in a counterflow stream at the point where the feed stock and catalyst stream undergoes a change in direction.

References Cited

UNITED STATES PATENTS

| | | | |
|---|---|---|---|
| 584,968 | 6/1897 | Taylor | 302—64 |
| 2,374,511 | 4/1945 | Upshaw | 23—288 E X |
| 2,695,265 | 11/1954 | Degner | 208—153 X |
| 3,149,885 | 9/1964 | Walsh | 302—64 |
| 3,607,127 | 9/1971 | Pfeiffer | 23—288 E |
| 2,461,172 | 2/1949 | Pelzer | 23—288 S X |
| 2,702,208 | 2/1955 | Hill | 302—59 |
| 2,753,221 | 7/1956 | Thayer | 302—59 |
| 2,767,031 | 10/1956 | Huffman | 302—59 |
| 2,875,000 | 2/1959 | Harper | 302—59 |

JOSEPH SCOVRONEK, Assistant Examiner

U.S. Cl. X.R.

23—288 E; 208—157